July 14, 1970    J. F. BISCHOFF    3,520,097
WINDOW FRAME CONSTRUCTION
Filed Oct. 7, 1968

INVENTOR
JOHN F. BISCHOFF
BY
Christensen, Sanborn & Matthews
ATTORNEYS

United States Patent Office 3,520,097
Patented July 14, 1970

3,520,097
WINDOW FRAME CONSTRUCTION
John F. Bischoff, 17101 Sea Lawn Drive,
Edmonds, Wash. 98020
Filed Oct. 7, 1968, Ser. No. 765,338
Int. Cl. E06b 7/08, 3/62
U.S. Cl. 52—456      4 Claims

ABSTRACT OF THE DISCLOSURE

A multi-panel framed window structure is disclosed wherein abutted Z-section members accommodate the mutually adjacent panel edges in oppositely directed channel portions of such members and accommodate a flat locking strip in codirected channels of such Z-section members so as to seal and lock the panels in substantially coplanar relationship. The channel of a peripheral framing member then accommodates the outer peripheral edges of the abutted panel sections as well as the lock strip and is secured thereto by means of a rivet or bolt passing through the channel flanges and the lock strip and one panel section flange or edge portion.

---

This invention relates to improvements in window frame structures such as may be used in house trailers, campers, pickup truck canopies and similar applications, and is herein illustratively described by reference to the presently preferred embodiment thereof. However it will be recognized that certain modifications and changes therein with respect to details may be made without departing from the essential features involved.

In the typical commercial production of camping trailers, pickup truck canopies and similar devices, low cost, rugged durability and simple lightweight construction are paramount objectives. A broad object of the present invention is to fulfill these objectives with respect to multi-panel window structures such as are suitable for applications of the type mentioned. A related objective is to provide a unitized multi-panel window construction in which an improved framing arrangement is employed which provides sealed joints between panels and which allows glass or plastic panels to be joined in substantially coplanar relationship with jalousie sections or other panel forms depending upon design choice in particular cases.

A further object hereof is to devise an improved and simplified multi-panel framed window construction of the unitized preassembled type the parts of which are few and simple and the assembly of which may be accomplished with minimum effort and tooling arrangements. The invention thus makes it practical to construct these window structures economically not only in mass production under factory conditions but also simply or in limited numbers in the smaller establishments which typically manufacture camper bodies, house trailers and similar products.

As herein disclosed the improved frame structure features the concept of mounting adjacent panels or flanges of panel sections in oppositely directed channels of parallel abutted Z-section members. The interface or gap between such Z-section members is then closed or covered by an overlapping web strip, the longitudinal edges of which are received in the codirected channels of the Z-section members, and the web also locks the Z-section members and their retained panel sections in substantially coplanar alignment. An outer framing channel then receives the outside peripheral flanges of the thus abutted panel sections and the web member and is joined therewith in place by a rivet or bolt passed through the frame channel flanges, and through the end of the web strip and one panel section flange held in the frame channel. If desired additional rivets or bolts may also be incorporated so as to positively join the other panel section to the framing channel.

These and oher features, objects and advantages of the invention will become more fully evident from the following description thereof by reference to the accompanying drawings.

Figure 1:
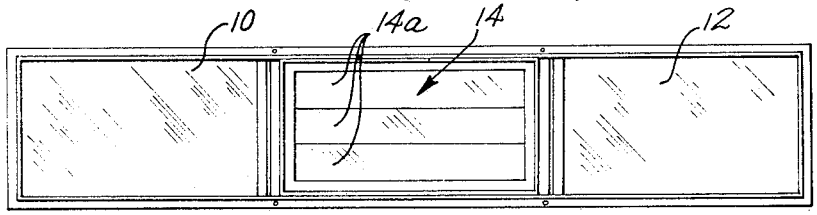
FIG. 1 is a face view of a unitized multi-panel window structure incorporating the invention.
Figure 2:
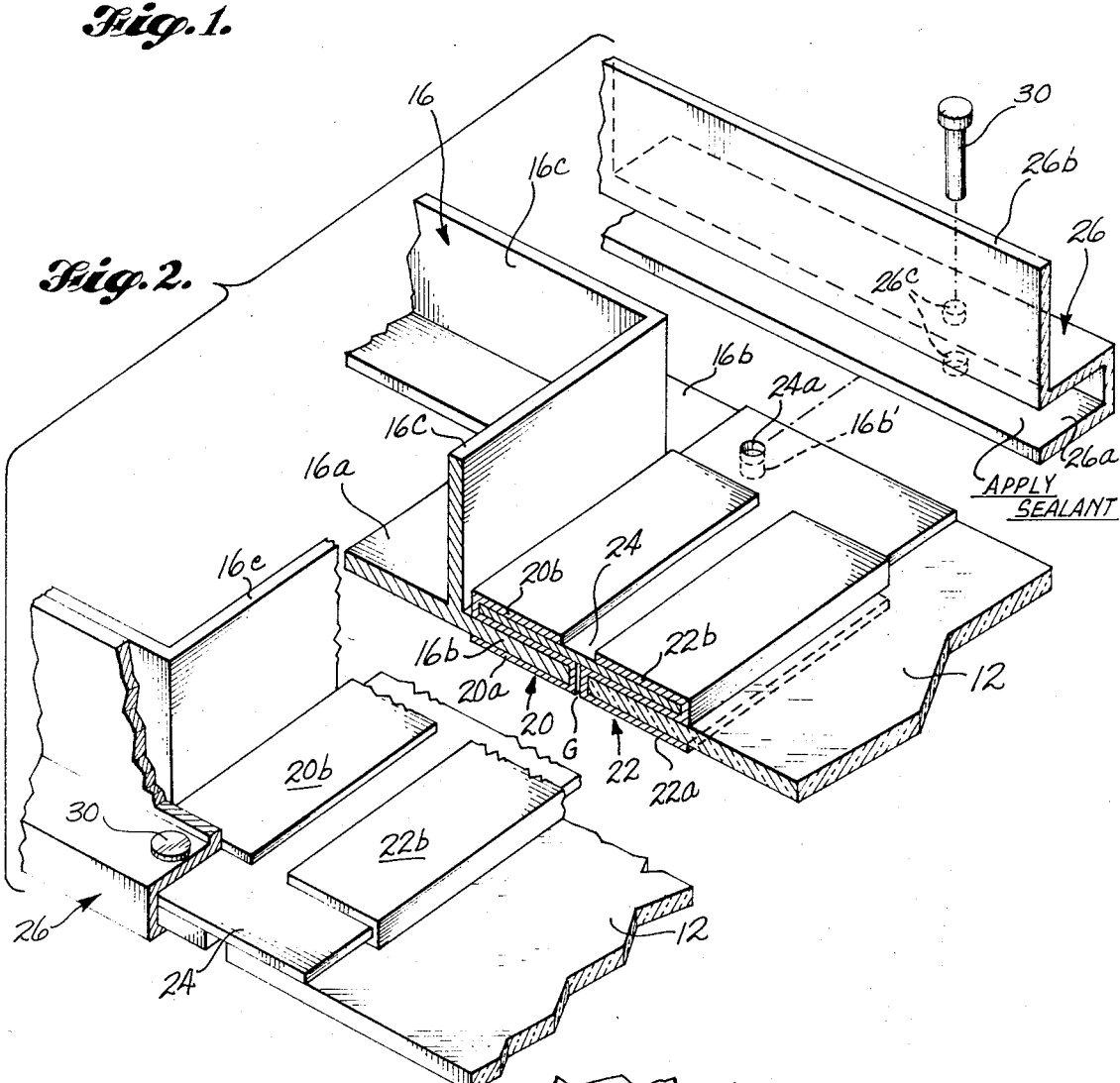
FIG. 2 is an exploded isometric view, with parts broken away and sectioned in order to illustrate the assembly of components at an intersection joint between panel sections and at the peripheral frame.
Figure 3:
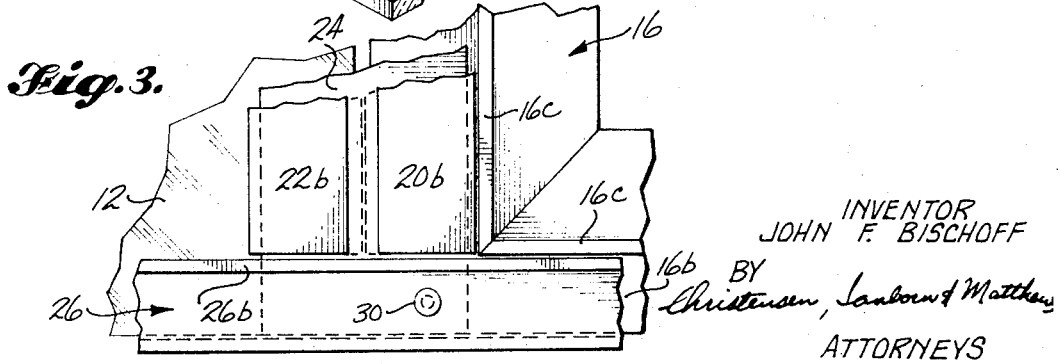
FIG. 3 is an enlarged fragmentary view illustrating the junction of peripheral frame and abutted panel sections and connecting members.

Referring to the drawings, the illustrated window structure comprises end panels 10 and 12 and an intermediate panel 14. Typically the end panels 10 and 12 will comprise glass or plastic sheets whereas the intermediate panel 14 will comprise a jalousie type panel. The jalousie unit 14 typically incorporates a plurality of adjustable tilting glass or plastic strips 14a mounted by suitable means (not shown) usually of a conventional nature within a supporting four-sided frame comprising the T-section member 16. T-section frame 16 comprises oppositely directed coplanar flanges 16a and 16b lying substantially in the plane of the window structure and a transverse or upright flange 16c intermediate the oppositely directed flanges 16a and 16b.

It is desirable in such a case to mount the end panels 10 and 12 in substantially coplanar relationship with jalousie unit flanges 16a and 16b. In so doing it is desirable to provide a ruggedly durable tightly sealed joint arrangement and one which will be easily assembled in the construction of the window structure. In accordance with this invention, first and second Z-section members 20 and 22 are mounted back-to-back or in abutting relationship, with the Z-section member 20 having a channel portion 20a which snugly receives the T-section flange 16b, and with the Z-section member 22 having a similar channel 22a directed oppositely from the channel 20a and receiving the edge of the plastic or glass panel 12. The interface or gap G between the two Z-section members 20 and 22 is sealed and covered over by a flat metal strip 24 inserted in the remaining codirected channels 20b and 22b of the Z-section members 20 and 22, respectively.

It will be noted that the insertion of a metal strip 24 in the codirected channels 20b and 22b not only seals the joint or gap G but it also serves the function of rigidly locking the Z-section members 20 and 22 in substantially fixed coplanar relationship and thereby maintains the panel 12 in coplanar relationship with the flanges of the T-section member 16. The locking strip 24 projects beyond the ends of Z-section members 20 and 22 preferably to the edge of panel 12 which is substantially aligned with the outer edge of the peripheral flange 16b of the T-section frame 16. The Z-section members preferably terminate at each end substantially in the outer face plane of the upstanding flange 16c of the framing member 16. As a result the peripheral flange 16b and the outer peripheral edge of the panels 10 and 12 may be received within the inwardly directed channel 26a of the outer framing member 26 without requiring the channel 26a to be unnecessarily wide or thick as it would be if it were required to receive the Z-section members also. Preferably the outer framing member 26 also has an upstanding or transverse flange 26b by which the completed window structure may be mounted in typical or suitable manner in a window opening formed in the side wall of a camper, pickup truck canopy, etc. This flange 26b in the usual case will neatly abut the ends of the Z-section members 20 and 22 and lie closely adjacent the outer face of the upstanding flange 16c of the T-section frame for the intermediate jalousie window unit 14. The resulting face-to-face and face-to-edge abutments of adjoining components thus adds rigidity to the total structure, presents a clean appearance and provides a tighter seal at the joints.

In order to rigidify the assembly and in particular to prevent bending of the outer framing member 26 away from the components which are held in its channel (these framing members usually being of lightweight aluminum material) a rivet or bolt 30 is passed through aligned holes 26c in the top and bottom flanges of the channel portion of framing member 26 and through aligned holes 24a and 16b' in the web strip 24 and T-section member flange 16b, respectively. If desired, an additional rivet or bolt may be passed through another set of holes (not shown) formed in the framing member channel portion and in the strip 24 and panel section 12 although, as a practical matter, this is not necessary to secure a rigid and durable joint structure.

In the application of the framing members 26 to the four sides defining the periphery of the panel assembly, bedding compound or weather strips are typically incorporated within the channel 26a at the top and bottom faces thereof so as to provide an airtight seal at the periphery. It will thus be evident that the process of assembly of such a window structure is relatively simple and quickly accomplished. The steps of bringing together the panel sections, three in this case, applying the pairs of Z-section members and locking strips 24 and thereupon forming the outer peripheral frame around the four sides of the assembly is readily accomplished without aid of special tooling or jigs. The final step of drilling holes 26c, 24a and 16b' and applying the rivets or bolts 30 completes the operation. It will be noted that only four such rivets are required in the case of a three section window, these being located at the four intersections of the peripheral frame and the abutment joints of the panels.

It will further be noted that no sealing compound is required at the abutment joints between the panels inasmuch as the locking strip 24 serves a sealing function as well as an alignment locking function for the panel sections. All major components of the assembly with the exception of the plastic or glass panels themselves may be of lightweight inexpensive aluminum or aluminum alloy extrusions. It is further evident that the intermediate section 14 may be a plain panel of glass or plastic material in which case the frame member 16 could be dispensed with and the hole 16b' would be formed in the plastic or glass comprising the intermediate panel instead of through the panel flange 16b as in the illustration. However, in case any of the panels 10 are glass and it is desired to secure the same directly by a bolt or rivet to the outer frame, it is of course desirable to frame the glass in metal and do the drilling through the metal rather than attempt to drill through the glass.

These and other aspects and features of the invention will be evident to those skilled in the art based on an understanding of the foregoing disclosure of the presently preferred embodiment.

I claim:

1. A framed multi-panel window structure comprising substantially coplanar panels with mutually adjacent edge elements, a pair of elongated Z-section members having oppositely directed channels receiving the respective edge elements and themselves substantially abutted at an interface therebetween, said Z-section members also having codirected channel portions, an elongated locking strip received in such codirected channel portions overlying said interface and maintaining said Z-section members and thereby the panels in substantial coplanar relationship, and peripheral framing means comprising an elongated channel portion receiving the panels therein in intersecting relationship with the Z-section members.

2. The combination defined in claim 1 wherein the channel portion of the framing member receives the channel members and an end portion of the locking strip, and wherein the combination further comprises a fastener element extending through the framing member and one of the panels.

3. The combination defined in claim 1 wherein the channel portion of the framing member receives the channel members and an end portion of the locking strip, and wherein the combination further comprises a fastener element extending through the framing member, one of the panels, and the locking strip projecting beyond the Z-section members.

4. The combination defined in claim 3 wherein one panel comprises a sheet of transparent material and wherein the other panel comprises a flanged metal framing member for such panel, which member has, at one edge of the panel, a flange received in one of the first-mentioned Z-section channel portions and has, at an adjoining edge, a flange received in the framing member channel portion.

References Cited

UNITED STATES PATENTS

| 835,863 | 11/1906 | Otte | 52—456 X |
| 3,101,820 | 8/1963 | Snyder et al. | 52—397 X |
| 3,426,493 | 2/1969 | Aspaas | 52—397 X |

FOREIGN PATENTS

| 544,881 | 1922 | France. |
| 292,880 | 6/1928 | Great Britain. |

ALFRED C. PERHAM, Primary Examiner

U.S. Cl. X.R.

52—207, 397, 473